UNITED STATES PATENT OFFICE.

WILLIAM C. TAYLOR, OF CORNING, NEW YORK, ASSIGNOR TO CORNING GLASS WORKS, OF CORNING, NEW YORK, A CORPORATION OF NEW YORK.

GLASS AND BATCH THEREFOR.

1,292,148.      Specification of Letters Patent.      Patented Jan. 21, 1919.

No Drawing. Application filed March 27, 1916, Serial No. 87,091. Renewed June 25, 1918. Serial No. 241,876.

*To all whom it may concern:*

Be it known that I, WILLIAM C. TAYLOR, a citizen of the United States of America, and a resident of Corning, New York, have invented certain new and useful Improvements in Glass and Batches Therefor, of which the following is a specification.

The object of this invention is to provide a glass capable of absorbing as completely as possible, in plates of small thickness, ultra-violet radiations, and being at the same time as permeable as possible to the visible radiations, and as nearly colorless as possible, or of a pleasing or unobjectionable color. Such glass finds a field of use in spectacles to protect the eyes from ultra-violet rays; in the form of globes or shades to surround artificial sources of light, especially those rich in ultra-violet radiations, such as mercury arc lamps, and in sheet form for windows and screens. The objectionable pathological effects of ultra-violet radiations, even if attenuated, upon the human eye, are well known.

It has been proposed to cut down the permeability of glass to the ultra-violet by the use of such materials that to produce a satisfactory ultra-violet cut-off, the glass must be colored so strongly as to seriously diminish the transmission of the visible rays.

I have discovered that the addition of oxidized vanadium gives a good ultra-violet absorption with the minimum of absorption of the visible light, the glass being greenish yellow, and nearly colorless. A glass containing vanadium in this form completely cuts off the ultra-violet .365 line in plates of 4 mm. thickness when present in the amount of one per cent., while when present in the amount of two per cent. the same cut-off is effected in plates of 2 mm. thickness. In certain instances it may be desirable to replace a part of the vanadium oxid with a cerium or a titanium oxid.

The following are given as examples of batch mixtures falling within the scope of this invention:

|  | A. | B. | C. | D. |
|---|---|---|---|---|
|  | Per cent. | Per cent. | Per cent. | Per cent. |
| Sand | 58.5 | 56 | 56 | 58.5 |
| Soda | 23.4 | 25 | 25 | 23.4 |
| Niter | 4.7 | 4.8 | 4.8 | 4.7 |
| Calcium carbonate | 8.8 | 5.6 | 5.6 | 8.8 |
| Titanium dioxid |  | 6.4 |  |  |
| Cerium nitrate |  |  | 6.4 |  |
| Vanadium oxid ($V_2O_5$) | 2.9 | .8 | .8 | 2.9 |
| Borax | 1.00 | .8 | .8 | 1.0 |
| Arsenic | .6 | .5 | .5 | .5 |
| Manganese dioxid |  |  |  | .5 |
|  | 99.9 | 99.9 | 99.9 | 100.3 |

Batch mixture "A" when properly melted results in a pale yellow green glass, which in plates of 2 mm. thickness cuts the .365 line.

It is obvious that if the intended use of the glass permits the use of plates 4 mm. thick or does not demand a complete cutting of the .365 line, the percentage of vanadium in composition A may be reduced, say, to 1 per cent.

In composition B, a part of the vanadium oxid is replaced by titanium oxid, and the resultant glass has a satisfactory ultra-violet absorption and transmission.

In composition C, in which a part of the vanadium oxid is replaced by cerium oxid, the resultant glass is a pale yellow, and cuts the .365 line in plates 2 mm. in thickness.

In composition D, a coloring constituent $MnO_2$ has been added to composition A to change the line from green to amber without affecting the ultra-violet absorption. In lieu of manganese dioxid cobalt oxid, nickel oxid, uranium oxid, etc., may be used and for the same purpose.

In the above batch formulæ it should be noted that the niter acts as an oxidizing agent and prevents reduction of vanadium salts present. We have found that to obtain the best results the vanadium should be preferably added in the form of vanadium oxid and that the reduction of this oxid should be prevented during refining and melting as completely as possible, as trioxid of vanadium ($V_2O_3$) gives to the glass no ultra-violet cut-off while coloring it a rich green.

It is obvious that while the formulæ above given are of glass batches, two or more of the ingredients of each composition may be first melted into a suitable glass to which the other ingredients may be added, and in this specification, and in the following claims, the term "batch" is used to include not only a mixture melted all at the same time, but also as being broad enough to include a case in which some of the ingredients are first melted, to which melt the other ingredients are added, or in other words, includes the synthetic formula of the glass without reference to the losses resulting from fining the melting. The vanadium can be used in lime, barium, lead or zinc glasses of about equally good results, but the color becomes muddy if any considerable amount of borax is present.

It is obvious that this invention is not limited in any way to the glass forming or other materials present in the glass, in so far as such materials do not interfere with the action of the materials claimed herein as producing or aiding in the production of the desired cut-off.

Having thus described the invention what I claim, and desire to secure by Letters Patent is,—

1. A glass for absorbing ultra-violet rays and containing an oxid of vanadium.

2. A glass for absorbing ultra-violet rays formed by melting a batch containing vanadium oxid and an oxidizing salt.

3. A glass for absorbing ultra-violet rays containing at least one per cent. vanadium oxid.

4. A glass for absorbing ultra-violet rays containing vanadium oxid and cerium dioxid.

5. A glass for absorbing ultra-violet rays resulting from the melting of a batch containing oxids of vanadium and cerium and an oxidizing ingredient.

6. A glass for absorbing ultra-violet rays containing vanadium and a small amount of a complementary, but absorptively inert, constituent to change the hue.

In testimony whereof I have signed my name.

WILLIAM C. TAYLOR.